United States Patent Office 3,836,445
Patented Sept. 17, 1974

3,836,445
PROCESS FOR THE HALOGENATION OF SIDE CHAINS OF AROMATIC COMPOUNDS
Tutomu Sano and Masaharu Doya, Niigata, Japan, assignors to Mitsubishi Gas Chemical Company, Inc., Tokyo, Japan
No Drawing. Filed Jan. 18, 1973, Ser. No. 324,869
Claims priority, application Japan, Jan. 24, 1972, 47/8,329
Int. Cl. B01j 1/10
U.S. Cl. 204—163 R          7 Claims

ABSTRACT OF THE DISCLOSURE

The invention relates to a process for the halogenation of the lower alkyl groups of aromatic compounds by reacting said aromatic compounds under irradiation with ultraviolet rays with a halogen in the presence of a N-lower alkyl-substituted acid amide such as N-methylformamide, N,N - dimethylformamide, N-N-dimethyl-acetamide or N-methyl urea.

---

This invention relates to a process for the halogenation of the side chains of aromatic compounds. More particularly, the invention pertains to a process for the halogenation of the side chains of aromatic compounds by using a free halogen under irradiation with a ultraviolet ray.

In halogenating the side chains of aromatic compounds with a free halogen under irradiation with a ultraviolet ray, there as been heretofore practiced a process in which such aromatic hydrocarbons, for example, as xylenes are dissolved in a solvent such as carbon tetrachloride and chlorine introduced into the resulting solution under irradiation with a ultraviolet ray.

The prior art process as mentioned above, however, had such drawbacks that since the process requires a high reaction temperature such as up to 150° C. and a considerably prolonged reaction time, fair amounts of nuclear halogen-substituted products and resinous products are by-produced, thereby lowering the yields of desired products and exerting adverse effect on the quality and purity of the desired products. Thus, the process has been scarcely regarded as an industrially advantageous process. The above drawbacks were considered serious in the production of such highly side chain-chlorinated xylenes as α,α,α,α',α',α' - hexachloro-m-xylene and α,α,α,α',α',α'-hexachloro-p-xylene, and there was involved a serious difficulty in the production of these xylenes on a commercial scale. To obviate such drawbacks, there have heretofore been proposed processes in which a catalyst such as alkylene polyamine, benzamide, urea, acetamide, triaryl phosphate and sorbitol. Each of these prior art processes, however, was not always found satisfactory in respect to the yield, quality and purity of products obtained thereby and the price of the catalyst employed.

For example, in U.S. Pat. No. 2,695,873 which is concerned with a process relying on the use as a catalyst of an acid amide such as acetamide, benzamido, urea or the like, the chlorine content of the crystalline product thereby obtained seems to be considerably lower than its theoretical amount, as is clear from the disclosure of said patent. This is to indicate that the crystalline product has been contaminated with nuclear halogen-substituted products, i.e. side-reaction products, and that the yield of desired product is actually not so high.

This is considered ascribable to the fact that the rate of reaction slows down and side reactions are apt to occur. This is because, the reaction is effected with the reaction system into which the aforesaid acid amide that is difficultly soluble in the starting compound and solvent has been nonuniformly dispersed, whereby the acid amide remains not to fully exhibit its catalytic action, and hydrogen chloride resulted during the reaction reacts with the catalyst to form a salt, which salt makes the reaction mixture turbid or come to adhere to the inside of the wall of reactor, thereby lowering the transmission of light.

We made extensive studies to overcome the aforementioned drawbacks and find a process in which the side chains of aromatic compounds are advantageously halogenated. As a result, we have been successful to find that the aforesaid drawbacks can be overcome and desired products may be obtained in a short time of reaction and in high yields by introducing under irradiation with a ultraviolet ray a halogen into aromatic compounds having side chains in the presence of a N-lower alkyl-substituted acid amide. Based on the above finding, the present invention has been accomplished.

As used herein, the term aromatic compounds having side chains are intended to include those which have lower alkyl groups as their side chains, such as toluene, xylenes and trimethyl-benzene and, aromatic compounds into which has been introduced a substituent that does not react with the halogen in the intended halogenation reaction, which substituent includes, for example, a halogen or, carboxyl, halogenated acyl, hydroxy or sulfone group. The use of a solvent in the present halogenation reaction is not critical, while easier control of heat of reaction at the early stage of the reaction is obtained when a solvent is used. In case a solvent is used, however, the solvent used is preferably removed during the reaction, because retention of the solvent in the system until the final stage of the reaction is disadvantageous from the standpoint of reaction rate. The solvents used in the present reaction are polyhalogenated hydrocarbons which are not reactive with halogen. Particularly, carbon tetrachloride is a preferred solvent. As used herein, the term halogen is intended to designate chlorine or bromine. By N-lower alkyl-substituted acid amide used in the present invention is meant compounds of the general formula

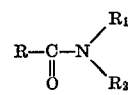

wherein R is hydrogen, a lower alkyl or

in which $R_3$ and $R_4$ are individually hydrogen or a lower alkyl, $R_1$ is hydrogen or a lower alkyl, and $R_2$ is a lower alkyl. Exemplary are N-methylformamide, N,N-dimethylformamide, N,N - dimethylacetamide, N - methylurea, N-ethylurea, N,N,N',N'-tetramethylurea and the like. The amount of the N-lower alkyl-substituted acid amide use is preferably 0.01 to 5% by weight based on the weight of aromatic compound having side chains. As the source of ultraviolet ray, various ultraviolet ray lamps, such as incandescent lamp, luminescent discharge tube, etc., may suitably be employed in the process of this invention. The halogenation intended is carried out at a reaction temperature within the range from 40° to 200° C. After completion of the reaction, a desired product may be recovered from the reaction product according to an ordinary procedure. For example, rectification of the reaction product after the reaction gives a desired product. The N-lower alkyl-substituted acid amide used in the present invention completely dissolves in a starting compound as well as in the solvent used, thereby rendering the reaction system homogeneous throughout the reaction. Moreover, hydrogen chloride formed during the reaction will not react with the catalyst present in the system to form a salt as is seen in the prior art processes.

The intended reaction proceeds very quickly and a desired compound, of which the side chains have been halogenated, may be obtained selectively in a short time and in high yield. The aromatic compounds having halogenated side chains obtained according to the process of the present invention are extremely useful as starting materials for the preparation of synthetic resins or intermediates thereof, or insecticides or cross-linking agents.

The present invention is concretely illustrated below with reference to examples.

In the following examples, a luminescent discharge tube which is efficient to emit the light having a wavelength from about 3000 to about 3600 Angstroms was employed as the source of ultraviolet ray.

Example 1

A 500 ml. reactor equipped with a thermometer, stirrer, blow-in pipe for chlorine and reflux condenser which also serves as an exhauster was fed with 110.4 g. (1.2 moles) of toluene, 220 g. of carbon tetrachloride and 1.1 g. of N,N-dimethylformamide as a catalyst, and thereinto was introduced chlorine at a rate of 1.24 mole/hr. under irradiation with ultraviolet ray at 70°–80° C. for 2.5 hours and, after removal by distillation of the carbon tetrachloride, the introduction of chlorine was continued at 130°–135° C. for 2.5 hours. After completion of the reaction, the liquid reaction product was analyzed according to gas chromatograph. The product formed was found to consist substantially of benzotrichloride, yield 98%.

Example 2

The same reaction apparatus as in Example 1 was used. The reactor was charged with 127.2 g. (1.2 moles) of m-xylene, 263 g. of carbon tetrachloride and 1.3 g. of N,N-dimethylformamide as a catalyst, and thereinto was introduced chlorine at a rate of 1.24 mole/hr. under irradiation with ultraviolet ray at 70°–80° C. for 5 hours. The introduction of chlorine was further continued, while distilling off the carbon tetrachloride, at 100° C. for 5 hours and then 130°–140° C. for 3 hours. After completion of the reaction, the liquid reaction product was analyzed according to gas chromatograph. The product formed was found to consist substantially of $\alpha,\alpha,\alpha,\alpha',\alpha',\alpha'$-hexachloro-m-xylene, yield 95.5%.

Referential Example 1

Example 2 was repeated, except that 1.3 g. of benzamide was used as a catalyst in place of 1.3 g. of the N,N-dimethylformamide.

The yield of $\alpha,\alpha,\alpha,\alpha',\alpha',\alpha'$-hexachloro-m-xylene formed thereby was 76.9%.

In the above case, under the heating condition at the time of initiation of the reaction, about one half of the amount of the benzamide remained undissolved and floated in the reaction mixture and near the bottom of reactor, and it took about 4 hours before complete dissolution of the benzamide. Furthermore, when the reaction initiated, hydrogen chloride evolved and, at the same time, crystals, which are considered to be hydrochloride of the benzamide, began to deposit, whereby the reaction mixture became turbid. The turbidity disappeared in 2–3 minutes, but a considerable amount of the crystals adhered to the inside of the wall of reactor, and about 4 hours lapsed before complete disappearance of the adhered crystals.

Referential Example 2

Example 2 was repeated, except that 1.3 g. of urea was used as a catalyst in place of 1.3 g. of the N,N-dimethylformamide.

The yield of $\alpha,\alpha,\alpha,\alpha',\alpha',\alpha'$ - hexachloro - m - xylene formed thereby was 78%.

In the above case, under the heating condition at the time of initiation of the reaction, the urea was in a crystalline form, but as soon as the reaction proceeded, it began to melt and disperse in the reaction mixture, whereby the mixture became translucent. It took about 10 hours before complete dissolution into the reaction mixture of the dispersed urea.

At the later stage of the reaction, furthermore, there was observed the formation of crystals that are considered to be decomposition products of urea.

Referential Example 3

The same reaction apparatus as in Example 1 was employed. The reactor was charged with 127.2 g. (1.2 moles) of m-xylene and 263 g. of carbon tetrachloride. Into the liquid reaction mixture was introduced chlorine at a rate of 1.28 mole/hr. under irradiation with ultraviolet ray at 80° C. for 5 hours. The introduction of chlorine was further continued, while distilling off the carbon tetrachloride, at 100° C., for 5 hours and then at 130°–140° C. for 10 hours. After completion of the reaction, the liquid reaction product was analyzed according to gas chromatograph. The reaction product was found to be a mixture composed of $\alpha,\alpha,\alpha',\alpha'$ - - tetrachloro - m - xylene, $\alpha,\alpha,\alpha,\alpha',\alpha'$ - pentachloro - m - xylene, $\alpha,\alpha,\alpha,\alpha',\alpha',\alpha'$-hexachloro - m - xylene, a nuclear halogen-substituted product and other high boiling material, yields 15.0%, 38.1%, 28.8%, 3.2% and 14.9% respectively.

Example 3

The same reaction apparatus as in Example 1 was employed. The reactor was fed with 127.2 g. (1.2 moles) of p-xylene, 263 g. of carbon tetrachloride and 0.6 g. of N,N-dimethylformamide, and thereinto was introduced chlorine at a rate of 1.28 mole/hr. under irradiation with ultraviolet ray at 70°–80° C., and the introduction of chlorine was further continued, while distilling off the carbon tetrachloride, at 100° C. for 5 hours and then 140° C. for 3 hours. After completion of the reaction, the liquid reaction product was analyzed according to gas chromatograph. The product formed was found to consist substantially of $\alpha,\alpha,\alpha,\alpha',\alpha',\alpha'$-hexachloro-p-xylene, yield 98%.

Example 4

The same reaction apparatus as in Example 1 was employed. The reactor was fed with 159.2 g. (1.5 moles) of m-xylene and 0.16 g. of N,N-dimethylformamide as a catalyst, and thereinto was introduced chlorine at a rate of 1.54 mole/hr. under irradiation with ultraviolet ray at 130–140° C. for 9.5 hours. After completion of the reaction, the liquid reaction product was analyzed according to gas chromatograph. The product formed was found to consist substantially of $\alpha,\alpha,\alpha,\alpha',\alpha',\alpha'$ - hexachloro-m-xylene, yield 92.1%.

Example 5

The same reaction apparatus as in Example 1 was employed. The reactor was fed with 159.2 g. (1.5 moles) of p-xylene and 0.16 g. of N,N-dimethylformamide as a catalyst, and thereinto was introduced chlorine at a rate of 1.54 mole/hr. under irradiation with ultraviolet ray at 130–140° C. for 9.5 hours. After completion of the reaction, the liquid reaction product was analyzed according to gas chromatograph. The product formed was found to consist substantially of $\alpha,\alpha,\alpha,\alpha',\alpha',\alpha'$-hexachloro-p-xylene, yield 96.2%.

Reference Example 4

The same reaction apparatus as in Example 1 was employed. The reactor was fed with 159.2 g. (1.5 moles) of m-xylene and thereinto was introduced chlorine at a rate of 1.54 mole/hr. under irradiation with ultraviolet ray at 130–140° C. for 11 hours. After completion of the reaction, the liquid reaction product was analyzed according to gas chromatograph. The reaction product was found to be a mixture composed of $\alpha,\alpha,\alpha',\alpha'$-tetrachloro-m-xylene, $\alpha,\alpha,\alpha,\alpha',\alpha'$ - pentachloro - m - xylene, $\alpha,\alpha,\alpha,\alpha',\alpha',\alpha'$ - hexachloro-m-xylene, a nuclear halogen-substituted product and other high boiling material, yields 15.3%, 41.8%, 30.4%, 2.4% and 10.1% respectively.

Example 6

Example 2 was repeated, except that 1.3 g. of N,N,N',N' - tetramethylurea was used as a catalyst. After completion of the reaction, the liquid reaction product was analyzed according to gas chromatograph. The product formed was found to consist substantially of $\alpha,\alpha,\alpha,\alpha',\alpha',\alpha'$-hexachloro-m-xylene, yield 93.0%.

Example 7

Example 2 was repeated, except that 1.3 g. of N,N-dimethylacetamide was used as a catalyst. After completion of the reaction, the liquid reaction product was analyzed according to gas chromatograph. The product formed was found to consist substantially of $\alpha,\alpha,\alpha,\alpha',\alpha',\alpha'$-hexachloro-m-xylene, yield 95.1%.

Example 8

Example 2 was repeated, except that 1.3 g. of N-methylformamide was used as a catalyst. After completion of the reaction, the liquid reaction product was analyzed according to gas chromatograph. The product formed was found to consist substantially of $\alpha,\alpha,\alpha,\alpha',\alpha',\alpha'$ - hexachloro - m-xylene, yield 90.2%.

Example 9

Example 2 was repeated, except that 1.3 g. of N-methyl urea was used as a catalyst. After completion of the reaction, the liquid reaction product was analyzed according to gas chromatograph. The product formed was found to consist substantially of $\alpha,\alpha,\alpha,\alpha',\alpha',\alpha'$ - hexachloro - m-xylene, yield 89.5%.

Example 10

Example 2 was repeated, except that 1.3 g. of N-ethyl urea was used as a catalyst. After completion of the reaction, the liquid reaction product was analyzed according to gas chromatograph. The product formed was found to consist substantially of $\alpha,\alpha,\alpha,\alpha',\alpha',\alpha'$-hexachloro-m-xylene, yield 89.5%.

Example 11

The same reaction apparatus as in Example 1 was employed. The reactor was fed with 127.2 g. (1.2 moles) of m-xylene and 0.26 g. of N,N-dimethylformamide as a catalyst, and thereinto was introduced chlorine at a rate of 1.24 mole/hr. under irradiation with ultraviolet ray at 130–140° C. for 9.5 hours. After completion of the reaction, the liquid reaction product was analyzed according to gas chromatograph. The product formed was found to consist substantially of $\alpha,\alpha,\alpha,\alpha',\alpha',\alpha'$-hexachloro-m-xylene, yield 89.0%.

What we claim is:

1. A process for the halogenation of the lower alkyl groups of aromatic compounds by reacting said aromatic compounds under irradiation with ultraviolet ray with a halogen, characterized by effecting the reaction in the presence of a N-lower alkyl-substituted acid amide of the general formula,

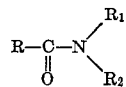

wherein R represents hydrogen, a lower alkyl or

in which $R_3$ and $R_4$ are individually hydrogen or a lower alkyl, $R_1$ represents hydrogen or a lower alkyl, and $R_2$ represents a lower alkyl.

2. A process according to Claim 1, wherein the N-lower alkyl-substituted acid amide is N-methylformamide, N,N-dimethylformamide, N,N-dimethylacetamide, N-methylurea, N-ethylurea, N,N,N',N'-tetramethylurea.

3. A process according to Claim 1, wherein the N-lower alkyl-substituted acid amide is present in an amount of from 0.01 to 5% by weight based on the weight of aromatic compound having side chains.

4. A process according to Claim 1, wherein the halogenation reaction is carried out at a temperature in the range of from 40° to 200° C.

5. A process according to Claim 1, wherein the aromatic compound is toluene, m-xylene or p-xylene.

6. A process according to Claim 1, wherein the halogen is chlorine or bromine.

7. A process according to Claim 5, wherein the methyl group is perchlorinated.

References Cited

UNITED STATES PATENTS 2,695,873  11/1954  Loverde _____ 204—163 R
2,844,635  7/1958  Mayor _____ 204—163 R BENJAMIN R. PADGETT, Primary Examiner